United States Patent
Locklear et al.

(10) Patent No.: US 11,814,588 B2
(45) Date of Patent: Nov. 14, 2023

(54) ELEMENTAL SULFUR DISSOLUTION AND SOLVATION

(71) Applicant: CONOCOPHILLIPS COMPANY, Houston, TX (US)

(72) Inventors: Jay Locklear, Houston, TX (US); David P. Cope, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 0 days.

(21) Appl. No.: 18/150,280

(22) Filed: Jan. 5, 2023

(65) Prior Publication Data
US 2023/0143184 A1    May 11, 2023

Related U.S. Application Data

(63) Continuation of application No. 17/494,470, filed on Oct. 5, 2021, now Pat. No. 11,572,514.

(60) Provisional application No. 63/234,398, filed on Aug. 18, 2021, provisional application No. 63/208,825, filed on Jun. 9, 2021, provisional application No. 63/184,469, filed on May 5, 2021, provisional application No. 63/111,841, filed on Nov. 10, 2020, provisional application No. 63/198,294, filed on Oct. 8, 2020.

(51) Int. Cl.
C10G 29/28 (2006.01)
C11D 3/34 (2006.01)

(52) U.S. Cl.
CPC ............ *C10G 29/28* (2013.01); *C11D 3/34* (2013.01); *C10G 2300/202* (2013.01); *C10G 2300/207* (2013.01); *C10G 2300/4075* (2013.01)

(58) Field of Classification Search
CPC ............ C10G 29/28; C10G 2300/202; C10G 2300/207; C10G 2300/4075; C11D 3/34
See application file for complete search history.

(56) References Cited

U.S. PATENT DOCUMENTS

| | | | |
|---|---|---|---|
| 3,197,396 A | 7/1965 | Stedman | |
| 3,708,421 A | 1/1973 | Rippie | |
| 4,283,270 A | 8/1981 | Mchale | |
| 4,478,512 A | 10/1984 | Zoltner | |
| 4,978,512 A | 12/1990 | Dillon | |
| 5,104,557 A * | 4/1992 | Lindstrom | C09K 8/532 507/90 |
| 5,199,978 A | 4/1993 | Poirier et al. | |
| 5,585,334 A | 12/1996 | Shaw | |
| 5,618,408 A | 4/1997 | Poirier et al. | |
| 6,808,919 B2 | 10/2004 | Ranson et al. | |
| 8,920,586 B2 | 12/2014 | Poulakis | |
| 9,612,204 B2 | 4/2017 | Locklear et al. | |
| 10,392,271 B2 | 8/2019 | Janson et al. | |
| 10,564,142 B2 | 2/2020 | Oduro | |
| 10,626,334 B2 | 4/2020 | Bertrand | |
| 11,199,078 B2 | 12/2021 | Sharma et al. | |
| 2008/0308463 A1 | 12/2008 | Keckler et al. | |
| 2012/0247515 A1 | 10/2012 | Taylor | |
| 2013/0149788 A1 | 6/2013 | Sacks et al. | |
| 2015/0267113 A1 | 9/2015 | Ramachandran et al. | |
| 2021/0102932 A1 | 4/2021 | Locklear et al. | |

FOREIGN PATENT DOCUMENTS

WO 2008049188 A1 5/2008
WO 2018001604 A1 1/2018

OTHER PUBLICATIONS

Taylor, G. N.; Matherly, R. Structural elucidation of solid byproduct from the use of 1,3,5-Tris(hydroxyalkyl) hexahydro-s-triazine based hydrogen sulfide scavengers. Industrial & Engineering Chemical Reserach. 2011, 50, 735-740.

Kwasniewski,, M.; Allison, R. B.; Wilcox, W. F.; Sacks, G. L. "Convenient, inexpensive quantification of elemental sulfur by simultaneous in situ reduction and calorimetric detection." Anal. Chim. Acta. 2011, 703 (1), 52-57.

ASTM D2622-16 "Standard test method for sulfur in petroleum products by wavelength dispersive X-ray Fluorescence Spectrometry.".

ASTM D5623-19 Standard test method for sulfur compounds in light petroleum liquids by gas chromatography and sulfur selective detection.

ASTM D5453-19a "Standard test method for determination of total sulfur in light hydrocarbons, spark ignition engine fuel diesel engine fuel, and engine oil by ultraviolet fluorescence.".

ASTM D4292-17 "Standard test method for determination of vibrated bulk density of calcined petroleum coke.".

ASTM D129-18 "Standard test method for sulfur in petroleum products (general high pressure decomposition device method).".

* cited by examiner

*Primary Examiner* — Randy Boyer
*Assistant Examiner* — Juan C Valencia
(74) *Attorney, Agent, or Firm* — Boulware & Valoir, PLLC

(57) ABSTRACT

Methods for preventing elemental sulfur deposition from a hydrocarbon fluid is disclosed. A mercaptan is added to a hydrocarbon fluid that has elemental sulfur and reacted with the elemental sulfur to produce a disulfide and hydrogen sulfide. Amines and/or surfactants can assist with the process. Secondary reactions between the disulfide and the elemental sulfur result in a polysulfide and a solvated sulfur-disulfide complex. The disulfide, hydrogen sulfide, polysulfide and solvated sulfur-disulfide complex do not deposit, and can optionally be removed.

20 Claims, No Drawings

ELEMENTAL SULFUR DISSOLUTION AND SOLVATION

PRIOR RELATED APPLICATIONS

This application is a continuation of U.S. application Ser. No. 17/494,470 (pending), filed Oct. 5, 2021, which claims priority to U.S. Ser. No. 63/184,469, filed May 5, 2021, and 63/234,398, filed Aug. 18, 2021, each incorporated by reference in its entirety for all purposes.

Application Ser. No. 17/494,470 also claims priority to U.S. Ser. No. 63/198,294, filed Oct. 8, 2020 and 63/111,841, filed Nov. 10, 2020, and 63/208,825, filed Jun. 9, 2021, each incorporated by reference in its entirety for all purposes.

FEDERALLY SPONSORED RESEARCH STATEMENT

Not applicable.

FIELD OF THE DISCLOSURE

The disclosure relates generally to methods of preventing sulfur corrosion and other damage in hydrocarbon production systems and wells by dissolving and solvating elemental sulfur from hydrocarbon fluids or deposits, thus preventing their deposition and/or removing any existing deposits.

BACKGROUND OF THE DISCLOSURE

Hydrocarbon fluids often contain a variety of sulfur compounds, including elemental sulfur. When sulfur is present in concentrations of 1 percent or more by weight, the hydrocarbon is characterized as "sour" and concentrations of 0.5 percent or less are "sweet" hydrocarbons. It is well known that elemental sulfur and other sulfur compounds contained in hydrocarbon streams are corrosive and damaging to metal equipment, particularly copper and copper alloys. The sulfur has a particularly corrosive effect on equipment such as brass valves, gauges, and in-tank fuel pump copper commutators.

Even after processing, sulfur and sulfur compounds may be present in a hydrocarbon stream in varying concentrations, and additional contamination may take place as a consequence of transporting the hydrocarbon stream through pipelines containing residual sulfur contaminants from previous transportation of sour hydrocarbon streams. This is problematic because it increases sulfur dioxide ($SO_2$) emissions when fossil fuels are combusted, and poisons catalysts utilized in the refining process. In addition, these contaminating sulfur compounds deposit on equipment, causing damage and necessitating expensive repairs.

Thus, there has been a long felt need to reduce the deposition of sulfur compounds in crude oils, as well as in all oil processing and transportation systems. The most common method of removing sulfur is "hydrodesulfurization." Hydrodesulfurization (HDS) is a catalytic chemical process widely used to remove sulfur (S) from natural gas and from refined petroleum products, such as gasoline or petrol, jet fuel, kerosene, diesel fuel, and fuel oils. Using ethanethiol ($C_2H_5SH$), a sulfur compound present in some petroleum products, as an example, the hydrodesulfurization reaction can be simply expressed as:

$$C_2H_5SH + H_2 \rightarrow C_2H_6 + H_2S$$

ethanthiol+hydrogen→ethane+$H_2S$

Although successful, removing the last traces of sulfur compounds where the sulfur atom is sterically hindered, as in multi-ring aromatic sulfur compounds, remains a significant challenge in hydrodesulfurization.

One recent area of innovation to remove sulfur from upgraded crude is oxidative desulfurization, a process that can operate under mild conditions and without the need for external $H_2$. US20080308463, for example, describes contacting the feedstock with an oxygen-containing gas in the presence of an oxidation catalyst comprising a titanium-containing composition whereby sulfur species are converted to sulfones and/or sulfoxides that are then adsorbed onto the titanium-containing composition.

Recently, biodesulfurization (BDS) has gained greater attention due to its environmentally benign process. U.S. Pat. No. 6,808,919, for example, describes contacting the hydrocarbon with enzymes from the genus *Alcaligenes* to transform the organic sulfur-containing compounds into inorganic sulfur compounds, which are more readily removed from the hydrocarbon.

Although all of the above methods evidence some degree of success, sulfur standards become ever more stringent, and crudes have steadily increasing sulfur content as conventional sweet crudes become increasingly exhausted, leaving mainly heavy and sour crudes for development. Thus, what is needed in the art are additional methods for preventing sulfur deposition on equipment.

SUMMARY OF THE DISCLOSURE

The present disclosure provides novel methods of preventing elemental sulfur from depositing from hydrocarbon fluids onto equipment and removing existing deposits by the addition of mercaptans, and is believed to proceed via the following reactions:

$$2R\text{—}S\text{—}H + \text{—}S\text{-} \leftrightarrow R\text{—}S\text{—}S\text{—}R + H_2S \quad \text{Eq. 1}$$

$$R\text{—}S\text{—}S\text{—}R + \text{—}S_n\text{-} \leftrightarrow R\text{—}S\text{—}S_n\text{—}S\text{—}R$$

In the first reaction (Eq. 1), the added mercaptans convert elemental sulfur in the hydrocarbon fluid or solid deposit to a disulfide and hydrogen sulfide, which can be removed by gas stripping. The produced disulfide is similar to disulfide surfactants that have previously been used to solvate and carry solid elemental sulfur through production systems without deposition. Here, the produced disulfide can dissolve, solvate, and/or suspend the elemental sulfur, and prevent it from depositing on process equipment and pipelines by the formation of a chemico-physical solvation.

Without being bound by theory, we postulate that chemico-physical solvation may include two parallel processes: a chemical process of disulfide reacting to make polysulfide and the disulfide/polysulfides causing a physical solvation of elemental sulfur in a "like dissolves like" manner.

There may be additional pathways under equation 1, where elemental sulfur has one or more sulfur atoms convert to $H_2S$ and the remaining sulfur atoms (now a charged polysulfide) could dissolve into a condensed water or produced water phase in the hydrocarbon stream. Additionally, a hydroxide disulfide could pull more elemental sulfur and polysulfide into the water phase.

The produced disulfide can also react with elemental sulfur to form polysulfides (Eq. 2). Like the solvated elemental sulfur, the polysulfide is able to move through the system without depositing on process equipment and pipelines. Both the solvated sulfur and the polysulfide to the extent that they partition into the aqueous phases can be removed from the hydrocarbon stream using conventional means such as an oil/water separator, and the like. To the extent that they remain with the hydrocarbon or the emulsion, they remain dissolved and/or solvated and thus do not deposit on equipment.

The methods are somewhat counterintuitive, as efforts have long been directed at removing mercaptans from hydrocarbon fluids, and one would not therefore be inspired to add mercaptans to hydrocarbon fluids. See e.g., U.S. Pat. No. 3,708,421 Process to remove mercaptan sulfur from sour oils. However, the presently described methods are theoretically able to reduce elemental sulfur deposition by increasing the total solids removal by about 33%.

In some embodiments of the presently disclosed methods, amines may also be added to the hydrocarbon fluids alongside the mercaptans to catalyze the reaction of Eq. 1. In general, tertiary amines with more basic pKa's catalyze better, but all worked to some extent.

In some embodiments of the presently disclosed methods, surfactants may also be added to the hydrocarbon fluids alongside the mercaptans to improve the reaction of Eq. 1 and/or enhance the dissolution of the disulfides. Alternatively, the surfactants may also be added to the hydrocarbon fluids before the addition of the mercaptans and/or after the disulfides are already dissolved.

In some embodiments of the presently disclosed methods, both amines and surfactants may be added to the hydrocarbon fluids alongside the mercaptans to catalyze the reaction of Eq. 1.

The present methods include any of the following embodiments in any combination(s) of one or more thereof:

A method of preventing sulfur deposition onto equipment from hydrocarbon fluids, said method comprising:

a) treating a hydrocarbon fluid containing elemental sulfur with a mercaptan under reaction conditions to produce disulfides, hydrogen sulfides, and optionally polysulfides;

b) optionally removing said hydrogen sulfides from said hydrocarbon fluid; and c) wherein said disulfides and said optional polysulfides are dissolved and/or solvated and do not deposit onto equipment from said hydrocarbon fluid.

A method of transporting hydrocarbon fluids in a pipeline, said method comprising:

a) treating a hydrocarbon fluid containing elemental sulfur with a mercaptan under reaction conditions to produce a disulfide, a hydrogen sulfide, and optionally a polysulfide;

b) optionally removing said hydrogen sulfide from said hydrocarbon fluid (either before or after transport); and c) transporting said hydrocarbon fluid in a pipeline, wherein said disulfide and said optional polysulfide are dissolved and/or solvated and do not deposit onto a surface of said pipeline from said hydrocarbon fluid.

Any of the herein described methods, wherein the mercaptan has a C1-C8 hydrocarbon chain.

Any of the herein described methods, wherein the mercaptan has a C1-C8 alcohol chain.

Any of the herein described methods, wherein the mercaptan is selected from methanethiol, ethanethiol, 1-propanethiol, 2-propanethiol, allyl mercaptan, butanethiol, tert-butyl mercaptan, pentanethiol, thiophenol, dimercaptosuccinic acid, thioacetic acid, 2-mercaptoethanol, dithiothreitol/dithioerythritol (an epimeric pair), 2-mercaptoindole, furan-2-ylmethanethiol, 3-mercaptopropane-1,2-diol, 3-mercapto-1-propanesulfonic acid, 1-hexadecanethiol, pentachlorobenzenethiol, and combinations thereof.

In principle, materials like tris(2-carboxyethyl)phosphine (TCEP) can produce the reductive environment for elemental sulfur to convert to $H_2S$, but it is yet unclear if these materials would produce polysulfides and therefore also have the added dissolution effect.

In some embodiments, methyl mercaptan, also called methanethiol ($CH_3SH$) may be preferred as the resulting dimethyl disulfide from reaction with elemental sulfur dissolves 100 g elemental sulfur per 100 g dimethyl disulfide at 20° C. Thus, this mercaptan helps remove even more elemental sulfur. In other embodiments, BME or DTT may be preferred, depending on the facility needs and the stream being treated.

Any of the herein described methods, wherein the amine is selected from alkyl amines, alkyl-hydroxy amines, amino acids, amino saccharides, diamines, triamines, alkyl benzyl amines, methylamine, propylamine, monoethanolamine, diethanolamine, isopropanolamine, diisopropanolamine, tris(2-aminoethyl)amine, glucosamine, ethylene diamine, methyldiethanolamine, triethanolamine, diethylenetriamine, pyrrolidone, triethylamine, 1-methyl-2-pyrrolidinone, N,N-dimethyl-N-(2-hydroxypropyl)amine, N,N,N'-trimethyl-N'-(2-hydroxypropyl)ethylenediamine, N,N,N',N"-tetramethyl-N"'-(2)-hydroxypropyl)diethylenetriamine, N,N,N',N",N"'-pentamethyl-N""-(2-hydroxypropyl)triethylenetetramine, and the like, or combinations thereof.

Any of the herein described methods, wherein the hydrocarbon fluid is treated with a mercaptan and an amine.

Any of the herein described methods, wherein the hydrocarbon fluid is treated with an amine and a surfactant.

Any of the herein described methods, wherein the hydrocarbon fluid is treated with a mercaptan and a surfactant.

Any of the herein described methods, wherein the hydrocarbon fluid is treated with a mercaptan, an amine, and a surfactant.

Any of the herein described methods, wherein the surfactant is selected from a group comprising quaternary ammonium ("quats") surfactants (QAS), gemini quaternary ammonium surfactant, linear or branched alkylbenzene sulfonates, and ethoxylates. Other possible surfactants include ethoxylated tetraethylene pentaamine, ethoxylated hexamethylene diamine dimethyl quat, ethoxysulfated hexamethylene diamine dimethyl quat, ethoxysulfated hexamethyl tri(amine methyl quat), propoxysulfated hexamethylene diamine dimethyl quat, ethoxy hexamethylene poly(amine benzyl quat), ethoxysulfated hexamethylene poly(amine benzyl quat), ethoxylated 4,9-dioxa-1,12-dodecanediamine dimethyl quat tetrasulfate, propoxylated-ethoxylated benzyl-quaternized trans-sulfated bis(hexamethylene)triamine, 50% sulfonated, propoxylated, ethoxylated methyl quat of hexamethylene diamine, benzyl quaternary ammonium, mono- or di alkyl ammonium chloride with alkyl chains of C6-C30, and mixtures thereof.

Any of the herein described methods, wherein the reaction conditions include a temperature between about 0-100° C., more preferably from 15-80° C., or about 30° C. Increasing temperatures will speed the reaction but may incur costs due the energy needs and hazards created by heating the chemicals.

Any of the herein described methods, wherein additional ingredients are used in the method, such as corrosion inhibitors, and the like.

As used herein, the term "hydrocarbon fluid" includes any gas or liquid containing hydrocarbons, as well as solids (e.g., heavy oils or bitumen) that can be liquified using heat and/or solvents.

As used herein, the term "thiol" or thiol derivative is any organosulfur compound of the form R—SH, where R represents an alkyl or other organic substituent. The —SH functional group itself is referred to as either a thiol group or a sulfhydryl group, or a sulfanyl group. Thiols are the sulfur analogue of alcohols (that is, sulfur takes the place of oxygen in the hydroxyl group of an alcohol), deriving from Greek θεῖον (theion) meaning 'sulfur'. Thiols are often referred to as "mercaptans" because the —SH binds strongly to mercury compounds.

The novel methods described herein can be applied to a variety of fluids, as long as the fluid contains elemental sulfur. The methods are particularly applicable to liquids which have become contaminated with elemental sulfur as a result of being transported in a pipeline previously used to transport sour hydrocarbon streams such as petroleum crudes or solvents used to remediate sulfur deposition (a.k.a. sulfur solvents). The fluids can be unrefined hydrocarbon streams, such as raw hydrocarbon condensates or black oil. Alternatively, the fluid can be a refined liquid hydrocarbon stream such as gasoline, jet fuel, waxes, and kerosene.

In another alternative, the fluid is a liquid or emulsion that is used in completion or treatment operations for a reservoir, including oilfield solvents such as methanol, monoethylene glycol, triethylene glycol, tetraethylene glycol. In yet another alternative, the fluid is a water and hydrocarbon mixture, or produced water, or a natural gas.

In some embodiments, the sample fluid is at least one of, but not limited to, a refined liquid hydrocarbon, an unrefined liquid hydrocarbon (e.g. condensates, black oils), solid hydrocarbons that can be solubilized into liquid hydrocarbons, oilfield solvents (e.g. methanol, monoethylene glycol, triethylene glycol, tetraethylene glycol), and/or combinations thereof.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

Any claim or claim element introduced with the open transition term "comprising," may also be narrowed to use the phrases "consisting essentially of" or "consisting of," and vice versa. However, the entirety of claim language is not repeated verbatim in the interest of brevity herein.

The following abbreviations are used herein:

| ABBREVIATION | TERM |
| --- | --- |
| BME | β-mercaptoethanol |
| GC | gas chromatography |
| GC-MS | gas chromatography-mass spectrometry |

-continued

| ABBREVIATION | TERM |
| --- | --- |
| GC/PSPD | gas chromatography/pulsed flame photometric detector |
| HPLC | high pressure liquid chromatography |
| LC | liquid chromatography |
| MS | mass spectrometry |
| NMR | nuclear magnetic resonance |
| PFPD | pulsed flame photometric detector |
| QAS | quaternary ammonium surfactants |
| Quats | quaternary ammonium |
| TCEP | tris(2-carboxyethyl)phosphine |
| UV-VIS | ultraviolet-visible |
| XRF | X-ray fluorescence |
| DTT | Dithiothreitol |
| BDS | Biodesulfurization |
| HDS | Hydrodesulfurization |
| CI | Corrosion Inhibitors |

DETAILED DESCRIPTION

The disclosure provides novel methods of preventing sulfur deposits in hydrocarbon fluid handling equipment through the use of added mercaptans. Adding mercaptans is counterintuitive to conventional desulfurizing methods, which aim to remove mercaptans and other sulfur-containing species. However, it was found that mercaptans can be added to the hydrocarbon fluids and reacted with elemental sulfur to produce more readily dissolved and/or solvated sulfur compounds, leading to a decrease in total solids of at least 30%.

In more detail, a mercaptan is added to a hydrocarbon fluid containing elemental sulfur under reaction conditions suitable for solvating sulfur and sulfur deposits. In some embodiments, mercaptans with a C1-C8 hydrocarbon chain may be utilized. Alternatively, mercaptans with an alcohol chain (OH—R—SH) may be used.

The mercaptan reacts with the elemental sulfur to produce hydrogen sulfide and a disulfide compound, per Eq. 1. This reaction dissolves and/or solvates about 30 to 35% of the elemental sulfur in the hydrocarbon fluid via the formation of the hydrogen sulfide.

The hydrogen sulfide can be removed from the hydrocarbon using known methods such as stripping with an amine gas. $H_2S$/mercaptan scavengers are used to move sulfur species to the water phase or change the sulfur to less corrosive materials. For example, $H_2S$ and mercaptans can be scavenged with triazines to less volatile, less corrosive species. The sulfur compounds no longer deposit and thus do not negatively impact equipment, and if desired can be removed at a suitable point or not.

The extent of partitioning to the water phase is currently undetermined, but this is one of the planned studies. Any sulfur compounds in the aqueous phase can easily be separated in the oil and water separator and disposed of accordingly.

The other reaction product, the produced disulfide, is capable of removing additional elemental sulfur by either (1) dissolving and solvating the elemental sulfur or (2) reacting with the elemental sulfur per Eq. 2. Both methods result in the formation of sulfur-containing components that can move through the process equipment without depositing sulfur.

As shown in Eq. 2, the disulfide reacts with elemental sulfur to form a polysulfide. The polysulfide is able to move through the system without depositing on process equipment and pipelines.

Alternatively, the disulfide dissolves and solvates the elemental sulfur much like a disulfide surfactant. Like the polysulfide, the solvate solid elemental sulfur can be carried through the equipment without deposition.

As both these reaction pathways for the disulfide can occur together, the amount of elemental sulfur being removed is theoretically about a 1:1 ratio with the produced disulfide. In other words, every gram of disulfide produced via Eq. 1 will remove an equal amount of elemental sulfur. Alternatively, the ratio of gram of disulfide to gram of removed elemental sulfur is between about 1:0.3 to about 1:1, or about 1:0.3 to about 1:0.5, or about 1:0.4 to about 1:0.75.

As mentioned above, the methods are somewhat counter-intuitive as one with skill in the art would not expect to need to add the very chemicals (sulfur-containing chemicals) they are usually trying to remove.

In test experiments with pure mercaptan in excess of the elemental sulfur present at room temperature and 1 atm, full dissolution occurred in 15-60 min in a static bottle test. In some embodiments, an amine can be added alongside the mercaptan to catalyze the reactions and decrease the reaction time. In addition, temperature increases will also speed reaction time. It is expected that such an amine can result in a reaction rate that is less than 5 minutes, less than 3 minutes, or 1 minute or less.

In other embodiments, a surfactant can be added alongside the mercaptan to enhance the dissolution reaction and help keep the dissolved components from depositing elsewhere in the process. Alternatively, both amines and surfactants can be added together with the mercaptan. The optimal order of addition is not yet known, and thus any order may be used, but for simplicity co-addition may be used.

The presently disclosed methods are exemplified with respect to the examples below. These examples are included to demonstrate embodiments of the appended claims. However, these are exemplary only, and the invention can be broadly applied to any combination of mercaptan, with and without an amine catalyst and/or surfactant. Those of skill in the art should appreciate that many changes can be made in the specific embodiments which are disclosed and still obtain a similar result without departing from the spirit and scope of the disclosure herein. In no way should the following examples be read to limit, or to define, the scope of the appended claims.

PHASE 1: PROOF OF CONCEPT

A solution of 99+% 2-mercaptoethanol (25 mL), water (20 mL), and 99+% triethylamine (5 mL) was made, and pH adjusted to pH 4 with HCl. This solution is not considered optimized, but provides an initial demonstration of the concept. 4 mL of solution was pipetted over varying amounts of 99+% purity elemental sulfur and allowed to sit static overnight to demonstrate elemental sulfur dissolution and estimate the solution's dissolution capacity. The results show that the sulfur can be dissolved in the method of the invention. Subsequent experiments will be tested in a mixed oil and water environment, and then the various component ratios will be optimized.

| Sample # | g Sulfur | mL dissolver | Complete Dissolution (yes or no) | Description |
|---|---|---|---|---|
| 1 | 0.100 | 4.000 | yes | clear-no yellow solids |
| 2 | 0.200 | 4.000 | yes | clear-no yellow solids |

-continued

| Sample # | g Sulfur | mL dissolver | Complete Dissolution (yes or no) | Description |
|---|---|---|---|---|
| 3 | 0.500 | 4.000 | yes | clear-no yellow solids |
| 4 | 0.570 | 4.000 | yes | clear-no yellow solids |
| 5 | 0.670 | 4.000 | no | yellow solids remain |
| 6 | 0.800 | 4.000 | no | yellow solids remain |
| 7 | 1.000 | 4.000 | no | yellow solids remain |
| 8 | 2.000 | 4.000 | no | yellow solids remain |

Estimated Dissolution Capacity
142.5 g elemental sulfur/L experimental solution

PHASE 2: (PROPHETIC) IDENTIFICATION OF REACTIONS

Phase 2 of our research is aimed at identifying and quantifying liquid products after reaction of elemental sulfur and BME. While reactions 1 and 2 (below) are the expected reversible reactions, there are other possible competitive reaction pathways which also result in $H_2S$ off-gas, e.g., dehydrogenation. Thus, a more thorough understanding and identifying the products in the liquid may allow for optimization of the application of BME or other thiols as a reactive sulfur solvent.

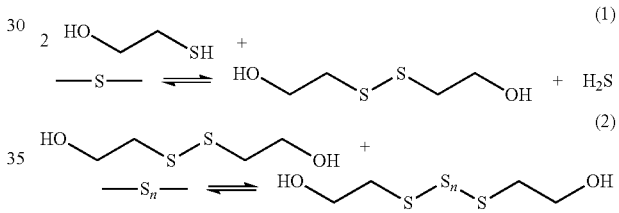

Once the stoichiometry is verified and products are determined, it will be possible to 'fine tune' the system for uptake rate, ultimate capacity and overall economics.

BME (as a 50 wt % aqueous solution) will be contacted with varying amounts of very pure elemental sulfur at ambient temperature (~20° C.) in order to identify and quantify species released during the process of sulfur uptake using various analytical techniques, such as GC, GC-MS, GC/PSPD, LC, HPLC, and the like.

Our preliminary testing indicated that the reaction may require a catalyst (amine catalyst) and that the catalyzed reaction is quite fast (on the minute timescale). Requirement of catalyst can be verified by performing tests with and without catalyst including varying levels and identity of catalyst. The same can be done with surfactants. Rates can be measured empirically by observing the time required for observable reaction to stop (no solid elemental sulfur or no gas evolution). If no reaction is observed, then the analysis will proceed after 24 hours.

PHASE 3: (PROPHETIC) IN SITU CONDITIONS

Phase 3 research will proceed using the best mercaptans, catalysts, surfactants and/or molar ratios identified in Phase 2 and will serve to confirm that the reactions still proceed as expected under down hole or produced fluid conditions. These will likely include efforts to study the effects of $H_2S$ overpressure, other production chemicals (CI, etc. for compatibility info), temperature dependence, various dilutions, high ionic strengths to verify that the chemistry would work in brine, verification of water miscibility, and labelling studies to determine the oil and water partitioning coefficients of the reagents and reaction products.

The above exemplary use of the methods is intended to be illustrative only, and not unduly limit the scope of the appended claims. Those of skill in the art should appreciate that many changes can be made in the specific embodiments which are disclosed and still obtain identical or similar result without departing from the spirit and scope of the disclosure herein. In no way should the following be read to limit, or to define, the scope of the appended claims.

The following references are incorporated by reference in their entirety for all purposes.

U.S. Pat. No. 3,708,421 Process to remove mercaptan sulfur from sour oils.

U.S. Pat. No. 4,283,270 Process for removing sulfur from petroleum oils

U.S. Pat. No. 5,199,978 Process for removing elemental sulfur from fluids

US20080308463 Oxidative desulfurization process

US20130149788 Assay for quantifying elemental sulfur levels in a sample

U.S. Pat. No. 10,564,142 Quantifying organic and inorganic sulfur components

U.S. Pat. No. 6,808,919 Biodesulfurization of hydrocarbons

ASTM D2622, ASTM D4292-16e1, ASTM D5453-93, ASTM D5623, ASTM D129-18.

The invention claimed is:

1. A method of preventing sulfur deposition onto equipment from hydrocarbon fluids, said method comprising:
 a) treating a hydrocarbon fluid containing elemental sulfur with a mercaptan plus an amine catalyst under reaction conditions to produce a disulfide, a hydrogen sulfide, and optionally a polysulfide;
 b) removing said hydrogen sulfide from said hydrocarbon fluid; and
 c) wherein said disulfide and said optional polysulfide are dissolved and remain in fluid and do not deposit onto equipment from said hydrocarbon fluid.

2. The method of claim 1, wherein said treating step further includes the addition of a surfactant or heat or combinations thereof.

3. The method of claim 1, further comprising the steps of dissolving and solvating elemental sulfur with said produced disulfide to produce a solvated complex and removing said solvated complex from the hydrocarbon fluid.

4. The method of claim 1, wherein said mercaptan has a C1-C8 hydrocarbon chain or a C1-C8 alcohol chain.

5. The method of claim 1, wherein said mercaptan is selected from ethanethiol, 1-propanethiol, 2-propanethiol, allyl mercaptan, butanethiol, tert-butyl mercaptan, pentanethiols, thiophenol, dimercaptosuccinic acid, thioacetic acid, 2-mercaptoethanol, dithiothreitol, dithioerythritol, 2-mercaptoindole, furan-2-ylmethanethiol, 3-mercaptopropane-1,2-diol, 3-mercapto-1-propanesulfonic acid, 1-hexadecanethiol, pentachlorobenzenethiol, and combinations thereof.

6. The method of claim 1, wherein said amine is selected from alkyl amines, alkyl-hydroxy amines, amino acids, amino saccharides, diamines, triamines, alkyl benzyl amines, methylamine, propylamine, monoethanolamine, diethanolamine, isopropanolamine, diisopropanolamine, tris(2-aminoethyl)amine, glucosamine, ethylene diamine, methyldiethanolamine, triethanolamine, diethylenetriamine, pyrrolidone, triethylamine, 1-methyl-2-pyrrolidinone, N,N-dimethyl-N-(2-hydroxypropyl)amine, N,N,N'-trimethyl-N'-(2-hydroxypropyl)ethylenediamine, N,N,N',N''-tetramethyl-N''-(2)-hydroxypropyl) diethylenetriamine, N,N,N',N'',N'''-pentamethyl-N''''-(2-hydroxypropyl)triethylenetetramine and combinations thereof.

7. The method of claim 1, wherein said amine is triethylamine.

8. The method of claim 1, wherein said method is preceded by i) testing said hydrocarbon fluid with and without a test amine catalyst, and ii) selecting a best amine catalyst for use in said method.

9. The method of claim 2, wherein said method is preceded by i) testing said hydrocarbon fluid with and without a test surfactant, and ii) selecting a best surfactant for use in said method.

10. A method of preventing sulfur deposition onto equipment from hydrocarbon fluids, said method comprising:
 a) treating a hydrocarbon fluid containing elemental sulfur under reaction conditions with i) a mercaptan and ii) an amine catalyst or a surfactant or both, to produce a disulfide, a hydrogen sulfide, and optionally a polysulfide;
 b) removing said hydrogen sulfide from said hydrocarbon fluid;
 c) wherein said disulfide and said optional polysulfide are dissolved and remain in fluid and do not deposit onto equipment from said hydrocarbon fluid.

11. The method of claim 9, wherein said method uses both said amine catalyst and said surfactant.

12. The method of claim 9, wherein said method is preceded by i) testing said hydrocarbon fluid with and without an amine catalyst, and ii) selecting a best amine catalyst for use in said method.

13. The method of claim 9, wherein said method is preceded by i) testing said hydrocarbon fluid with and without a surfactant, and ii) selecting a best surfactant for use in said method.

14. The method of claim 10, wherein said method is preceded by i) testing said hydrocarbon fluid with and without an amine catalyst, ii) selecting a best amine catalyst for use in said method, iii) testing said hydrocarbon fluid with and without a surfactant, and iv) selecting a best surfactant for use in said method.

15. A method of preventing sulfur deposition onto equipment from hydrocarbon fluids, said method comprising:
 a) treating a hydrocarbon fluid containing elemental sulfur with a mercaptan under reaction conditions to produce one or more products including a disulfide, a hydrogen sulfide, and a polysulfide, wherein said mercaptan is selected from ethanethiol; 1-propanethiol; 2-propanethiol; allyl mercaptan; butanethiol; tert-butyl mercaptan; pentanethiol s; thiophenol; dimercaptosuccinic acid; thioacetic acid; 2-mercaptoethanol; dithiothreitol/dithioerythritol; 2-mercaptoindole; furan-2-ylmethanethiol; 3-mercaptopropane-1,2-diol; 3-mercapto-1-propanesulfonic acid; 1-hexadecanethiol; pentachlorobenzenethiol, and combinations thereof; and
 b) wherein said hydrogen sulfide is removed by gas stripping and said disulfide and said polysulfide do not deposit onto equipment from said hydrocarbon fluid.

16. The method of claim 14, wherein said mercaptan is ethanethiol or 2-mercaptoethanol or dithiothreitol or combinations thereof.

17. The method of claim 14, wherein said treating step further includes the addition of an amine or a surfactant or heat or combinations thereof.

18. The method of claim 16, wherein said amine is selected from alkyl amines, alkyl-hydroxy amines, amino acids, amino saccharides, diamines, triamines, alkyl benzyl amines, methylamine, propylamine, monoethanolamine, diethanolamine, isopropanolamine, diisopropanolamine, tris (2-aminoethyl)amine, glucosamine, ethylene diamine, methyldiethanolamine, triethanolamine, diethylenetriamine, pyrrolidone, triethylamine, 1-methyl-2-pyrrolidinone, N,N-dimethyl-N-(2-hydroxypropyl)amine, N,N,N'-trimethyl-N'-(2-hydroxypropyl)ethylenediamine, N,N,N',N"-tetramethyl-N"-(2)-hydroxypropyl)diethylenetriamine, N,N,N',N",N'''-pentamethyl-N'''-(2-hydroxypropyl)triethylenetetramine and combinations thereof.

19. The method of claim 16, wherein said surfactant is selected from a group consisting of ethoxylated tetraethylene pentaamine, ethoxylated hexamethylene diamine dimethyl quat, ethoxysulfated hexamethylene diamine dimethyl quat, ethoxysulfated hexamethyl tri(amine methyl quat), propoxysulfated hexamethylene diamine dimethyl quat, ethoxy hexamethylene poly(amine benzyl quat), ethoxysulfated hexamethylene poly(amine benzyl quat), ethoxylated-4,9-dioxa-1,12-dodecanediamine dimethyl quat tetrasulfate, propoxylated-ethoxylated benzyl-quaternized trans-sulfated bis(hexamethylene)triamine, 50% sulfonated, propoxylated, ethoxylated methyl quat of hexamethylene diamine, benzyl quaternary ammonium; mono- or di alkyl ammonium chloride with alkyl chains of C6-C30; and mixtures thereof.

20. A method of preventing sulfur deposition onto equipment from hydrocarbon fluids, said method comprising:
a) treating a hydrocarbon fluid containing elemental sulfur with a mercaptan and an amine catalyst under reaction conditions to produce one or more product(s) selected from a disulfide, a hydrogen sulfide, and a polysulfide;
b) wherein said mercaptan is selected from ethanethiol, 2-mercaptoethanol, dithiothreitol/dithioerythritol and combinations thereof;
c) wherein said amine catalyst is selected from tertiary amines or triethylamine; and
d) wherein said product(s) do not deposit onto equipment from said hydrocarbon fluid.

\* \* \* \* \*